(12) United States Patent
Colosimo

(10) Patent No.: US 12,111,139 B2
(45) Date of Patent: Oct. 8, 2024

(54) DIRECTED-ENERGY WEAPON SHIELD

(71) Applicant: BAE Systems plc, London (GB)

(72) Inventor: Nicholas Giacomo Robert Colosimo, Preston (GB)

(73) Assignee: BAE Systems plc, London (GB)

( * ) Notice: Subject to any disclaimer, the term of this patent is extended or adjusted under 35 U.S.C. 154(b) by 0 days.

(21) Appl. No.: 18/688,864

(22) PCT Filed: Aug. 18, 2022

(86) PCT No.: PCT/GB2022/052143
§ 371 (c)(1),
(2) Date: Mar. 4, 2024

(87) PCT Pub. No.: WO2023/037092
PCT Pub. Date: Mar. 16, 2023

(65) Prior Publication Data
US 2024/0271913 A1    Aug. 15, 2024

(30) Foreign Application Priority Data

Sep. 13, 2021 (EP) .................................. 21275129
Sep. 13, 2021 (GB) .................................. 2113013

(51) Int. Cl.
*F41H 5/06* (2006.01)
*B64G 1/10* (2006.01)
*B64G 1/24* (2006.01)
*B64G 1/52* (2006.01)
(Continued)

(52) U.S. Cl.
CPC ............. *F41H 5/06* (2013.01); *B64G 1/1085* (2013.01); *B64G 1/242* (2013.01); *B64G 1/52* (2013.01); *G05D 1/695* (2024.01); *G05D 2109/40* (2024.01)

(58) Field of Classification Search
CPC .......... F41H 5/06; F41H 13/00; G05D 1/695; B64G 1/1085; B64G 1/54
See application file for complete search history.

(56) References Cited

U.S. PATENT DOCUMENTS 4,847,506 A    7/1989  Archer
5,044,579 A    9/1991  Bernasconi
5,151,819 A    9/1992  Stephens
(Continued)

FOREIGN PATENT DOCUMENTS

CN    101367440 A    2/2009
CN    111824463 A    10/2020
(Continued)

OTHER PUBLICATIONS

European Search Report for Application No. 21275129.1 mail date Feb. 14, 2022, 7 pages.
(Continued)

*Primary Examiner* — J. Woodrow Eldred
(74) *Attorney, Agent, or Firm* — Maine Cernota & Curran

(57) ABSTRACT

There is provided a vehicle for protecting an entity against directed-energy weapons, comprising: a housing; and a shield for absorbing or reflecting a laser beam, the shield, in use, extending in a plane from the housing. There is also provided a system of vehicles and a method of coordinating a plurality of vehicles to protect an entity against directed-energy weapons.

14 Claims, 4 Drawing Sheets

(51) Int. Cl.
  *G05D 1/695*     (2024.01)
  *G05D 109/40*    (2024.01)

(56) References Cited

U.S. PATENT DOCUMENTS

| | | | |
|---|---|---|---|
| 8,757,552 B1 | 6/2014 | Martin | |
| 10,591,587 B2* | 3/2020 | Blanchard | F41H 11/00 |
| 11,091,280 B1 | 8/2021 | Conn | |
| 2017/0127507 A1* | 5/2017 | Hunt | H05H 1/46 |
| 2018/0127115 A1 | 5/2018 | Choi | |
| 2019/0023419 A1 | 1/2019 | Helvajian | |
| 2020/0130795 A1 | 4/2020 | Fikes | |
| 2020/0284911 A1 | 9/2020 | Hamamo | |
| 2021/0226694 A1 | 7/2021 | Cherrette | |

FOREIGN PATENT DOCUMENTS

| | | |
|---|---|---|
| CN | 112498749 A | 3/2021 |
| WO | 2018011753 A1 | 1/2018 |

OTHER PUBLICATIONS

GB Search Report for Application No. GB2113013.3 mail date Jun. 7, 2022, 3 pages.
International Search Report and Written Opinion for International Application No. PCT/GB2022/052143 mail date Nov. 9, 2022, 12 pages.

\* cited by examiner

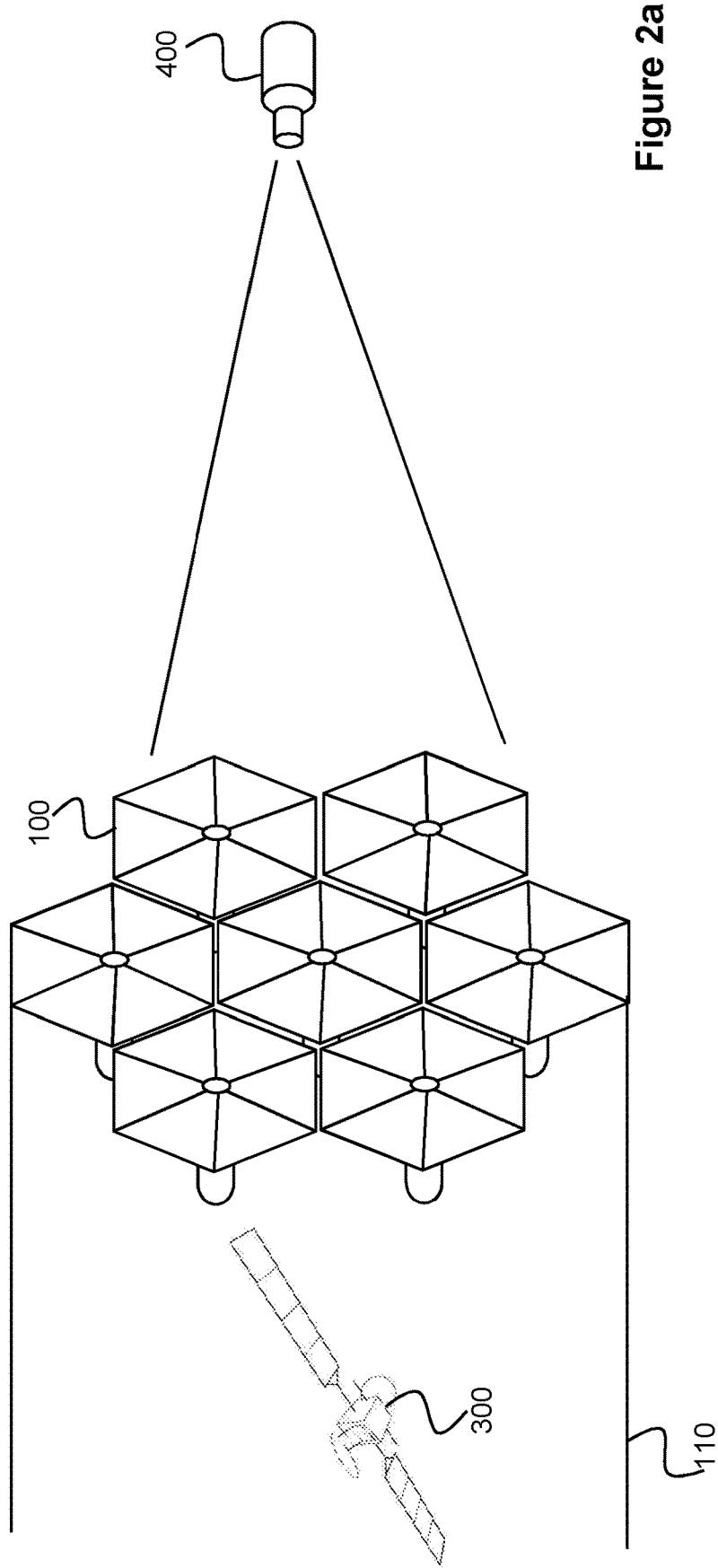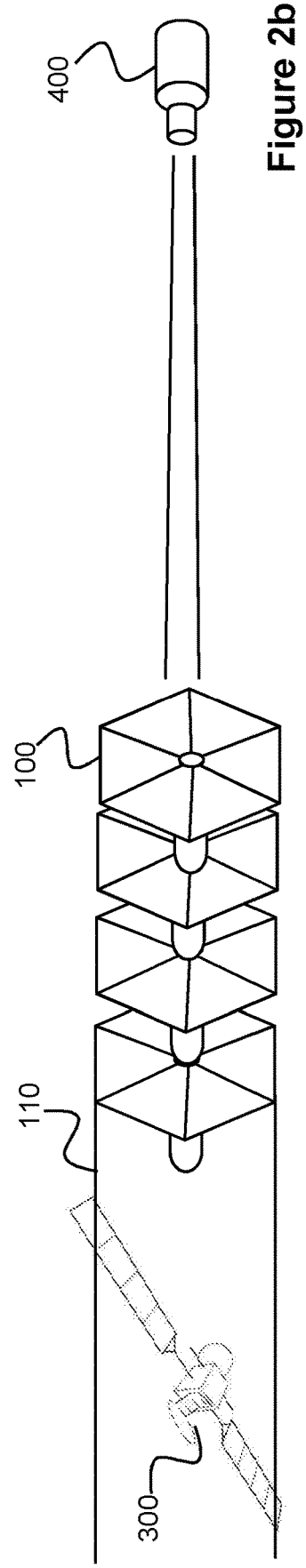

DIRECTED-ENERGY WEAPON SHIELD

RELATED APPLICATIONS

This application is a national phase application filed under 35 USC § 371 of PCT Application No. PCT/GB2022/052143 with an International filing date of Aug. 18, 2022, which claims priority of GB Patent Application 2113013.3 filed Sep. 13, 2021 and EP Patent Application 21275129.1 filed Sep. 13, 2021. Each of these applications is herein incorporated by reference in its entirety for all purposes.

FIELD

The present invention relates to a vehicle for protecting an entity against directed-energy weapons. Particularly, but not exclusively, the vehicle is for protecting spacecraft against laser weapons. The present invention also relates to a system and a method of coordinating a plurality of vehicles to protect an entity against directed-energy weapons

BACKGROUND

Space is becoming a highly competitive territory, both commercially and strategically. Many nations have launched strategically important satellites, necessary for functions such as communications, navigation, intelligence gathering, and scientific research. These satellites are expensive, as well as complex and time-consuming to replace. Therefore, nations have developed weaponry to destroy such satellites to remove commercial or strategic advantage. Laser weaponry is particularly well-suited for conflict in space, and is challenging to defend against.

Further, there is now a large amount of debris in space, particularly in Low Earth Orbit. Debris includes defunct satellites and parts of spacecraft. This debris, and the functional satellites themselves, can be travelling at up to 7 kilometres per second. Therefore, significant or catastrophic damage to satellites may be incurred if they collide with debris.

It would be advantageous to provide a low-cost means to protect satellites, and other spacecraft, from weapons and debris.

The same problem can be found in the terrestrial domain, as laser weapons are becoming more cost effective and portable. Therefore, it would also be advantageous to provide aircraft with a defence against laser weapons.

Reflective shields, ablative surfaces, and ceramic coatings are just some examples of mechanisms for protecting an object from thermal exposure, but these tend to be disposed on-board the vehicle being protected and therefore cannot be adapted to suit a live threat.

SUMMARY

According to a first aspect of the present invention, there is provided a vehicle for protecting an entity against directed-energy weapons, comprising:
a housing; and
a shield for absorbing or reflecting a laser beam, the shield, in use, extending in a plane from the housing.
Advantageously, the vehicle can be positioned between an entity, particularly a satellite, and a directed-energy weapon such that the vehicle can be damaged by a laser emitted from the directed-energy weapon instead of the entity. The vehicle is repositionable to respond to unknown or changing threats. The vehicle can operate as part of a swarm of similar vehicles in order to effectively protect an entity.

The shield may comprise a reflective material. The shield may comprise a metal foil. The shield may comprise an ablative layer.

The shield may comprise hinged spokes for supporting the shield, the hinged spokes each being arranged to rotate about a respective axis such that in the stored configuration the axes of the hinged spokes are arranged substantially parallel to each other, and in the deployed configuration the spokes are arranged radially with respect to the housing.

The vehicle may comprise telescopic spokes for supporting the shield, the hinged spokes each being arranged to extend radially away from the housing in the deployed configuration.

The vehicle may comprise:
a gas source; and
a plurality of hollow members coupled to the gas source and to the shield,
wherein the hollow members are inflatable on the opening of a valve and wherein the inflation of the hollow members causes the plurality of members to support the shield in a planar configuration.

The vehicle may comprise a secondary shield member rotatably coupled to the shield arranged to rotate in use to cover a region of the shield when the shield becomes damaged.

The vehicle may comprise:
at least one sensor for detecting a laser beam and generating data relating to the laser beam; and
a controller for making position and/or attitude adjustments to the vehicle based on the data, wherein the data comprises at least one of the angle of attack of the laser beam, the strength of the laser beam, and the footprint of the laser beam.

The shield may comprise a first layer and a second layer disposed adjacent to the first layer, wherein the first layer comprises a material with high thermal conductivity and the second layer comprises a material having a high emissivity.

The vehicle may comprise a gradient index reflector disposed on an outside surface of the shield. The gradient index reflector may be disposed along the central axis of the shield.

The housing may be an elongate tube having a first end and a second end, the shield extending from the first end, wherein in the stored configuration, the axes of the hinged spokes are parallel with the longitudinal axis of the housing. The elongate tube may be hexagonal in cross-section.

The vehicle may be a satellite comprising positional thrusters and telecommunications equipment for receiving control instructions, and the entity may be a spacecraft. Alternatively, the vehicle may be an aircraft, such as an unmanned aircraft, and the entity may be another aircraft.

According to a second aspect of the present invention, there is provided a system for protecting an entity against directed-energy weapons, comprising a plurality of vehicles according to the first aspect, and at least one controller operative to control the positions of the vehicles using a swarm algorithm.

The plurality of vehicles may be arranged such that the plane of each of the shields is arranged in the same plane and wherein each of the shields is arranged adjacent to another of the shields. Alternatively, the plurality of vehicles may be arranged such that each axis through the centre of the shield of each vehicle is collinear.

According to a third aspect of the present invention, there is provided a method for coordinating a plurality of vehicles to protect an entity against directed-energy weapons, comprising:

defining, as a command vehicle, a vehicle in the plurality;

storing, by one or more storage devices located on one or more of the vehicles, a list of positions of each vehicle and a position of a laser weapon;

determining, by one or more processors on the command vehicle, a shield configuration achievable by the plurality of vehicles that minimises the probability of an entity associated with the plurality of vehicles being struck by a laser beam fired by the laser weapon; and sending, from the command vehicle to each vehicle a movement command that causes the respective vehicle to move to achieve the shield configuration.

The method may comprise:

by one or more sensors, sensing a laser beam incident on at least one of the plurality of vehicles;

determining, by the one or more processors, a beamwidth of the laser beam; and repositioning, using the one or more processors, at least one vehicle in the plurality to minimise the probability of the entity being struck by the laser beam.

BRIEF DESCRIPTION OF THE FIGURES

Embodiments of the invention will now be described by way of example only with reference to the figures, in which:

FIGS. 2a and 2b show alternative arrangements of a system of satellite shields according to an embodiment;

DETAILED DESCRIPTION

The present disclosure predominantly relates to protecting satellites against laser weapons. Generally, the countermeasure described herein is to deploy a plurality of sacrificial swarm satellite shields between the targeted satellite and the adversary weapons system. Each of the satellite shields in the swarm is designed to absorb and/or reflect radiation directed towards the targeted satellite. All satellite shields may be in communication such that they can be positioned to most effectively protect the targeted satellite. The command and control system for the satellite shields may be distributed, or the swarm may be centrally controlled. Each of the satellite shields may be controlled by the targeted satellite, a ground station. The command and control system may be decentralised (i.e. the swarm may be self-organising). The satellite shields may have deployable shields to enable easy packing for transport to space.

While the description that follows relates to protecting satellites against laser weapons, the skilled addressee would appreciate the same concept could be applied to aircraft operating within the Earth's atmosphere, if the satellite shields were modified for atmospheric flight. For example, the satellite shields could be equipped with wings, and/or rotors. Further, the satellite shields tend to serve the purpose of protecting the targeted satellite from space debris.

Figure 1:
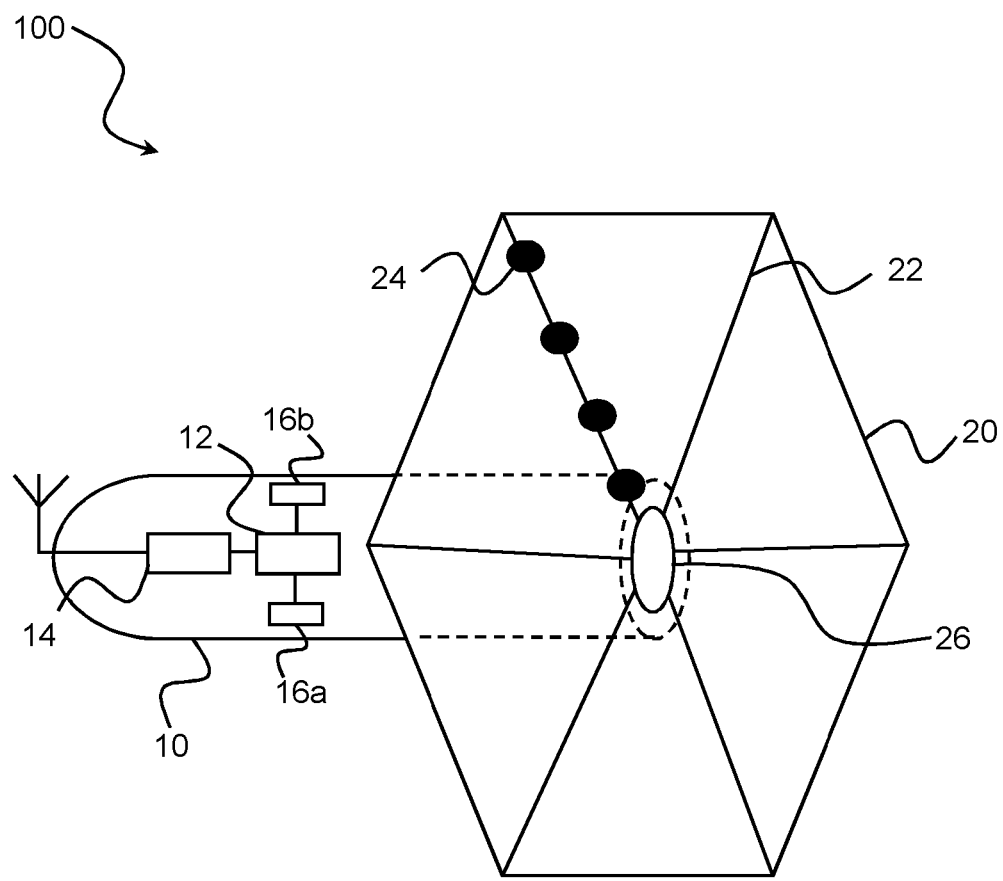
FIG. 1 shows a systematic view of a satellite shield according to an embodiment.

A swarm satellite 100 for protecting a targeted satellite 300 will now be described with reference to FIG. 1. Arrangements of such swarm satellites 100 with reference to a targeted satellite 300 and an adversary laser directed-energy weapon (LDEW) system 400 will be described with reference to FIGS. 2a and 2b.

The swarm satellite 100 comprises a main body 10, and a deployable shield 20 extending from the main body 10. The main body 10 may be in the shape of a cylinder or a tube with a polygonal cross-section (such as a hexagonal tube). This tends to permit higher packing density for launch of multiple swarm satellites 100 from the targeted satellite 300. Herein a collection of cooperating shields 20 will be referred to as a swarm shield.

The angle of a cone subtended between the targeted satellite 300 and the position of the laser weapon should be completely blocked by the swarm shield if the targeted satellite is to be protected. In other words, there should be no permissible line of sight from the LDEW system 400 to the targeted satellite 300. Therefore, if the swarm shield is located close (<1 km) to the targeted satellite 30, which is advantageous when it is not known where the LDEW system 400 (i.e. the threat) is, then the swarm shield should be about as wide as the full width of the targeted satellite 300. Therefore, the total swarm shield diameter could be anywhere from about 1 metre to about 50 metres, depending on the size of the satellite 300 being protected. This means the shields 20 of individual swarm satellites 100, which form the overall swarm shield, should be some fraction of that aforementioned diameter in size dependent upon how many swarm satellites 100 are initially deployed with the targeted satellite. Preferably, the diameter of a shield 20 is between about 1 metre and 10 metres. Preferably, the length of the main body 10 is between about 1 metre and 3 metres.

The angle subtended by a cone of protection provided by a single shield 20 is given by the equation:

$$A = \arctan\left(\frac{(d_s - d_t)}{2}/r\right)$$

whereby:

A is the angle subtended by a cone of protection provided by the shield 20;

$d_s$ is the diameter of the shield 20;

$d_t$ is the diameter of the targeted satellite 300; and r is the distance from the shield 20 to the targeted satellite 300.

This same equation can be used to determine the scope of protection offered by a swarm shield (i.e. tessellated shields 20 operating together) at a particular distance from the targeted satellite 300, by using the diameter of the swarm in place of the diameter of the shield 20.

Conversely, if the location of the LDEW system 400 is known, its sight line can be blocked much more easily and with a smaller diameter swarm shield, due to the swarm shield being positionable further away from the targeted satellite 300 but closer to the LDEW system 400.

Preferably, the swarm satellites 100 should be positioned such that they block laser line of sight (angle subtended by the targeted satellite 300 to the LDEW system 400) whilst not blocking the field of regard needed by the targeted satellite 300 to perform its own functions.

The shield 20 extends radially away from one end of the main body 10. When deployed, the plane of the shield 20 is arranged orthogonally to the longitudinal axis of the main body 10. The shield 20 is initially retracted to enable improved packing of the swarm satellites 100 when stored. Once the swarm satellite 100 is in situ, the shield 20 deploys.

The front surface of the shield 20 faces the adversary LDEW 400. The shield 20 may deploy like an umbrella. In other words, the shield 20 includes spokes 22. The spokes 22 are hinged at the end attached to the main body 10. These spokes 22 rotate about the hinge such that their longitudinal axes move from being substantially parallel with that of the main body 10, to substantially orthogonal to the longitudinal axis of the main body 10. The spokes 22 may be spring-loaded to deploy on the swarm satellite's ejection from the targeted satellite 300, on a timer, or on a received command. Alternatively, an electric motor may drive the spokes 22 to rotate about the hinge. In another embodiment, the spokes 22 are telescopic rather than hinged, and are therefore driven to extend along their longitudinal axes. In another embodiment, the shield 20 is fixed relative to the main body 10.

In an alternative embodiment, the radial spokes 22 (or arms) are formed of inflatable tubes coupled to a source of gas within the main body 10. Progressive inflation from the source of gas is used to assist in the deployment of the shield 20. For example, the radial spokes 22 may have a cavity in vacuum prior to deployment. When a valve on the source of gas is released, the gas may fill the vacuums thereby inflating the radial spokes 22. Once deployed the radial spokes 22 are fully inflated they become rigid and therefore prevent deflection of the shield 20. Here, the spokes 22 may be made of a puncture proof material such as Vectran.

In addition to the spokes 22, the shield 20 is formed of a robust, resilient, and reflective material. In an alternative embodiment, the shield 20 material is suitably rigid to be self-supportive, without additional structural members such as spokes 22.

The shield 20 may be formed of a highly reflective material such as a metal foil, such as an aluminium or copper foil. However, one problem with using only a foil is the material works well as a reflector to start with but soon begins to darken as a result of oxidation (if in an atmosphere) and other chemical processes. This now means more energy is absorbed than reflected. Eventually the material melts because its melting point is reached.

Figure 3:
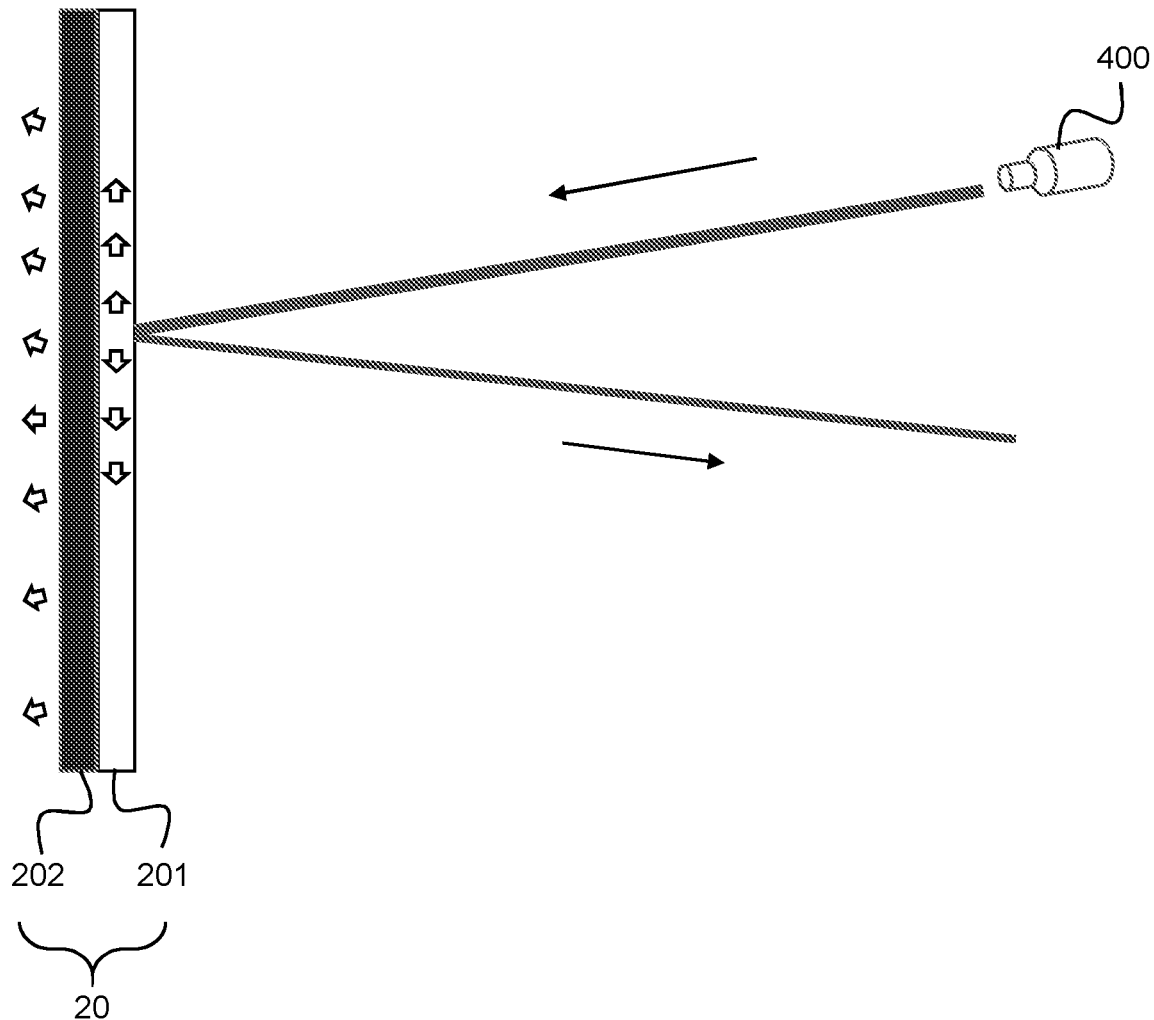
FIG. 3 is a system diagram showing the structure of a shield according to an embodiment.

An example of a shield 20 structure according to an embodiment is illustrated in FIG. 3. Here, this shield 20 is formed of two layers. A conductive layer 201, on the outside of the shield 20 (i.e. facing toward the LDEW system 400) is formed of a material having high thermal conductivity, such as copper or aluminium. An emissive layer 202, coating at least one side of the conductive layer 201 (i.e. at least the side facing away from the LDEW system 400), is a high emissivity coating. The emissive layer 202 is a perfect or near-perfect black body. A perfect black body is a perfect emitter of radiation but also a perfect absorber of radiation. Many suitable paints are available to provide such a coating, such as Nextel. Carbon-based materials which have a spikey surface geometry forming trillions of tiny cavities are also now available and provide suitable coatings.

FIG. 3 shows how heat is transferred across and through the shield 20. Heat energy that strikes the conductive layer 201 dissipates through the material through conductivity. Heat is dissipated from the rear of shield 20 through thermal radiation since the high emissivity coating 201 (black body surface) is highly radiative. This aids in removing any absorbed heat from the shield 20 struck by the laser weapon, which forces the LDEW system 400 to work harder to penetrate the shield 20. If the coating 201 has the capability to radiate away more heat than the LDEW system 400 can input, then the LDEW system 400 is defeated. Further, as the radiation is now spread across a large range of angles (as the coating 201 is a Lambertian emitter), the scattered radiation is less likely to damage the targeted satellite 300.

In an alternative embodiment, the shield 20 is again formed of two layers. An air gap may be disposed between the two layers such that heat can only transfer between the two layers by thermal radiation. A reflective layer is disposed facing the LDEW system 400. The reflective layer may be a polished material such as aluminium or copper foil, or thicker rigid pieces of aluminium or copper.

A layer having a high specific heat capacity and a high melting point is disposed adjacent to the reflective layer, facing away from the LDEW system 400. The higher the specific heat capacity, the more energy is required to raise its temperature. One example of such a material is a ceramic. The ceramic layer could comprise an array of solid non-deformable 'petals'. These petals could be in the form of small hexagonal or other tessellation-capable shapes attached to a flexible and elastic substrate, such that when deployed there are no gaps between the many petals. Alternatively, a ceramic coating could be sprayed onto a flexible substrate.

In an alternative embodiment again, the shield 20 may comprise an ablative material. The incoming laser energy heats up the ablative material but has to put a disproportionate amount of thermal energy in to do so. After a point, the ablative material begins to lose cohesion (towards the melting point where ceramics suddenly lose their tensile strength). This causes fragments of the layer to break away and in so doing remove heat along with acting as a further scattering medium through which the laser beam emitted by the LDEW system 400 has to pass. Ablative layers tend to have the disadvantage of not being reusable, and further the fragmented ablative material becomes further space debris that poses a risk to the satellite 300.

The shield 20 may have the ability to self-repair. This may be achieved through spatial movements such as by drawing in another swarm satellite 100 to move in front of the damaged portion of the shield 20. Alternatively, or additionally, the shield 20 may comprise a rotary reserve petal arranged to rotate around the shield 20 to cover a petal (i.e. region of the shield 20) penetrated or otherwise damaged by a LDEW system 400. The motor for driving the reserve petal to rotate may be coupled to a controller 12 (described later) for determining the location of damage.

Returning to FIG. 1, the plan shape of the shield 20 is illustrated as being hexagonal to enable for tessellation of a plurality of shields 20 of other swarm satellites 100 in the system. This tessellation is illustrated in FIG. 2a. The skilled addressee would appreciate other shield 20 shapes may provide a similar advantage, such as an octagonal shield 20. Each swarm satellite 100 in the system may have a different shield 20 shape. The shield 20 may be circular according to another embodiment.

The swarm satellite 100 comprises a controller 12. The controller 12 may take any suitable form. For instance, it may be a microcontroller, plural microcontrollers, a processor, or plural processors. While shown disposed here inside the main body 10 of the swarm satellite 100, it would be appreciated that the controller 12 could equally be disposed inside the shield 20. The swarm satellite 100 may further comprise a storage device for storing operating instructions for the controller 12.

A plurality of LDEW detectors 24 are disposed on the surface of the shield 20. The LDEW detectors 24 are disposed on the side of the shield 20 facing away from the main body 10 (i.e. they are disposed on the front surface of the shield 20). In the illustrated embodiment, the LDEW detectors 24 are radially arranged on each of the spokes 22. The LDEW detectors 24 in one embodiment are photodiodes tuned to particular (or several) laser wavelengths. A neutral density filter may be disposed over the photodiodes to allow them to detect strong LDEW radiation without themselves being destroyed in the process.

Data generated by the LDEW detectors 24 is transmitted to the controller 12. The data may be stored in the storage device, such as a SDD, HDD, or Random Access Memory. The controller 12 processes the generated data to determine the size and position of the energy footprint of the laser beam from the LDEW 400. Further, the controller 12 may determine the angle of attack and intensity of the incoming laser beam. This data can then be used to determine swarm satellite 100 positional and attitude adjustments. These adjustments may cause the swarm satellite 100 to move such that the footprint of the laser beam is centred on the centre of the shield 20. In other words, through LDEW detection, irradiance of the shield 20 is maximised (and therefore irradiance of objects behind the plane of the shield 20 is minimised) by fine positioning and attitude adjustment. The arrangement of swarm satellites 100 can therefore be optimised in real time to account for changing position, pointing angle and/or beamwidth of the adversary LDEW 400.

In embodiments where only one LDEW detector 24 is disposed on the shield 20, it may be the case that data relating to the laser beam is limited to its angle of attack and/or intensity.

To effect propulsion of the swarm satellite 100, the swarm satellite 100 is fitted with a plurality of thrusters 16a, 16b (generally 16). The thrusters 16 may be activated independently by the controller 12 to control the direction in which the swarm satellite 100 is pointing. In other words, the thrusters 16 are for position and attitude adjustment of the swarm satellite 100. The thrusters 16 are shown disposed at the top and bottom of the main body 10 towards its centre, however, it would be appreciated this is for illustrative purposes only. The thrusters 16 may be positioned at any point along the length of the main body 10, or in nacelles or wings attached thereto. The thrusters 16 may be ion thrusters. Other propulsion means include rockets, electrosprays, field emission electric propulsion devices, Hydrazine monopropellant thrusters, and cold gas thrusters. The swarm satellite 100 also includes guidance and navigation systems.

The controller 12 is coupled to a transceiver 14. In one embodiment, the transceiver 14 is operable to provide two-way communication with the targeted satellite 300. The swarm satellite 100 may transmit its location to the targeted satellite 300. The location may be relative to the targeted satellite 300. The location may be calculated using an inertial navigation system. Data relating to the size and position of the LDEW footprint (i.e. the area of effect of the adversary LDEW 400) is transmitted to the targeted satellite 300. The targeted satellite 300 comprises a controller arranged to control a plurality of swarm satellites 100.

The controller of the targeted satellite 300 is arranged to determine the optimal configuration of swarm satellites 100 for preventing the LDEW from striking the targeted satellite. This determination may be based on the surface area of the shields 20 of the swarm satellites 100, the LDEW footprint, the distance between the adversary LDEW 400 and the targeted satellite 300, and the number of available swarm satellites 100. Two such configurations are illustrated in FIGS. 2a and 2b, although it would be appreciated that other configurations may be determined by the controller. The controller may employ any suitable swarm control algorithm. In other words, the targeted satellite 300 generates and transmits control signals for controlling each of the swarm satellites 100 in a system. The decision for the positioning of individual swarm satellites 100 within the configuration may be determined by such factors as their incurred damage, remaining fuel, distance from the position, or size of their shield 20.

The swarm satellites 100 are positioned to block the laser line of sight between an adversary LDEW 400 and the targeted satellite 300 (i.e. the satellite to be protected). Blocking the laser line of sight effectively creates a shadow region 110 in which the targeted satellite 300 is located.

FIG. 2a illustrates one example of an arrangement of swarm satellites 100 which shadow a targeted satellite 300 against an incoming laser beam. Here, the incoming laser beam has a relatively wide fan angle (in other words, beam divergence) such that the footprint at the target length (position of the targeted satellite 300 relative to the adversary LDEW 400) is much greater than the diameter of a single shield 20. The footprint increases with distance from the adversary LDEW 400, while the energy of the laser beam reduces with distance from the adversary LDEW 400. Therefore, while placing one swarm satellite 100 in the path of the laser beam in proximity to the source may effectively shadow the targeted satellite 300, this may not be effective where the power of the laser beam at this target length is high enough to burn through the respective shield 20 almost immediately. Further, due to positional uncertainty in the adversary LDEW 400, or uncertainty in the number of adversary LDEWs, it can be advantageous for the swarm satellite shields 20 to create a shadow region 110 with a large diameter. Therefore, the tessellated arrangement of FIG. 2a is the default arrangement of swarm satellites 100 until incoming energy is detected by the LDEW detectors 24 or the targeted satellite 300. Here, the shields 20 of the swarm satellites 100 are all arranged in substantially the same plane and adjacent to each other. In an alternative arrangement, the planes of adjacent shields 20 are offset from each other along an axis between them and the targeted satellite 300, while in plan view the shields 20 are adjacent to each other. This tends to minimise the risk of swarm satellites 100 colliding with each other.

Each of the swarm satellites 100 follows the same orbital path as the targeted satellite 300 but are offset by a safe distance to minimise collision risk. This means the targeted satellite 300 remains in shadow region 100 throughout its movement relative to the Earth.

FIG. 2b illustrates another example of an arrangement of swarm satellites 100 which shadow a targeted satellite 300 against an incoming laser beam. This is a stacked configuration, which tends to improve the countermeasure resilience versus the incoming laser energy. When one swarm satellite 100 is burned through, another is immediately behind to continue shadowing the targeted satellite 300. In other words, each satellite 100 in the system of swarm satellites is arranged along an axis passing through the centre of each shield 20, where the front surface of each shield 20 points in the same direction.

The targeted satellite 300 may be in communication with another entity, such as a control station on Earth. In other words, the targeted satellite 300 has a communications field of regard. Furthermore, the targeted satellite 300 may have a sensing system, for example an imaging system for photographing parts of the Earth. In other words, the targeted satellite 300 has a sensing field of regard. When positioning the swarm satellites 100, the controller manoeuvres the swarm satellites 100 such that they do not inhibit the sensor or communications field of regard.

In an alternative embodiment, instead of a controller of the targeted satellite 300 being used to control the system of swarm satellites 100, each is in communication with (i.e. controlled by) a ground station on Earth.

In an alternative embodiment still, the command and control system for the swarm satellites 100 is distributed (i.e. decentralised). Here, the transceiver 14 of one swarm satellite 100 is in two-way communication with all of the other swarm satellites in the system. Distributed command and control may be achieved by any of a number of known techniques. One such example is for each swarm satellite 100 in a system of swarm satellites to bid for a role or position, with the bid based on factors such as its current position, level of damage, remaining fuel, or size of shield 20. Alternatively, the controller 12 of each swarm satellite 100 in the system is arranged to control the system as a whole. Therefore, one swarm satellite 100 is designated the leader, in the same manner as the targeted satellite described above. As the designated leader is destroyed, another equally skilled swarm satellite 100 is selected to take its place as controller of the system.

The swarm satellites 100 may be self-organising. Methods include stochastic and local threshold based. In essence, this is truly decentralised. The satellite shields 100 self-organise based upon some local knowledge in the main and from that an emergent collective intelligence emerges.

In the illustrated embodiment, a reflector 26 is positioned at the centre of the shield 20. The reflector 26 may be a Gradient-index (GRIN) reflector or a corner reflector. The reflector 26 provides the swarm satellite 100 with the ability to directly send back (retro-reflect) incoming laser energy, thereby causing the adversary LDEW 400 to self-harm in effect.

A method of protecting a satellite or other space-faring vessel, particularly from laser attack, will now be described with reference to FIG. 4. In a first step 300, a laser weapon threat is identified. This may be achieved by a ground station, for example, receiving radar telemetry or other intelligence indicating the presence of an adversary LDEW 400 posing a threat to a satellite 300. Alternatively, if the LDEW 400 is in the process of being fired, detecting a laser weapon threat may involve the LDEW detectors 24 receiving an incoming laser beam.

In an optional step, in response to detecting an LDEW 400, the swarm satellites 400 are immediately positioned as shown in FIG. 2a. In other words, the shields 20 of each of the swarm satellites 100 are tessellated and the system as a whole is placed in the optical path between the LDEW 400 and the satellite 300. Here, the greatest surface area of shielding 20 is presented to a potential incoming laser beam coming from the direction of the LDEW 400, which is advantageous where the beam strength or width is unknown.

In step S302, the beamwidth and position of an incident laser beam is determined using the LDEW detectors 24. This may involve each swarm satellite 100 reporting to a central controller whether its LDEW detector(s) 24 has detected an energy pulse greater than a threshold value. Where an energy detection is below the threshold value, the swarm satellite 100 must be outside or at the fringe of the laser footprint.

At step S304, each of the swarm satellites 100 reports its position to a central controller. In another embodiment, all swarm satellites 100 report their positions to each other.

At step S306, the central controller or distributed controller controls swarm satellites 100 not being struck (or significantly struck) by the laser beam to be repositioned into the configuration shown in FIG. 2b. Here, swarm satellites 100 not initially in the path of the laser beam have been moved coaxially with those swarm satellites 100 that are in the path of the laser beam. This creates more of an obstacle for the laser beam to burn through.

Figure 4:
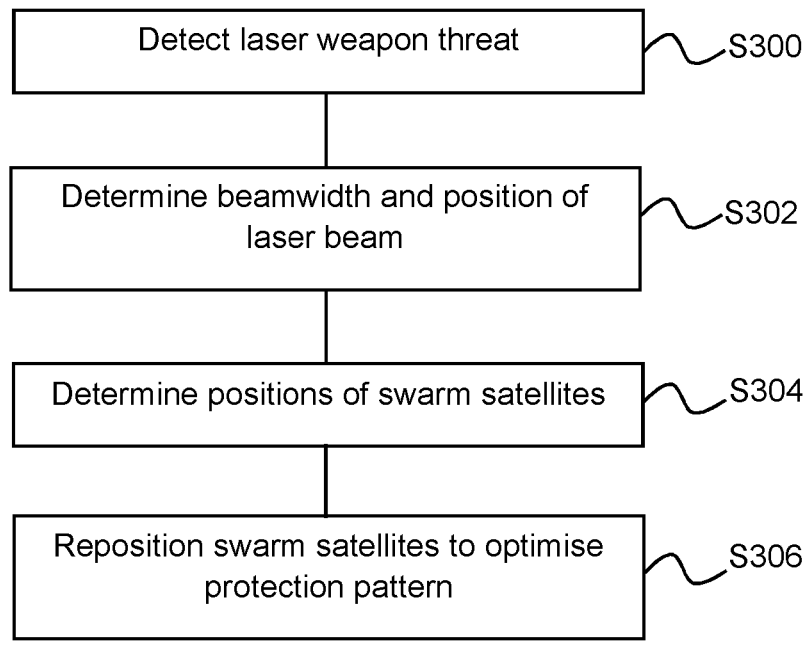
FIG. 4 is a flowchart illustrating a method of protecting a satellite according to an embodiment.

It should be noted that certain of the process steps depicted in the flowchart of FIG. 4 and described above may be omitted or such process steps may be performed in differing order to that presented above and shown in FIG. 4. Furthermore, although all the process steps have, for convenience and ease of understanding, been depicted as discrete temporally-sequential steps, nevertheless some of the process steps may in fact be performed simultaneously or at least overlapping to some extent temporally. Furthermore, the process steps may be performed continuously.

While the above disclosure relates to protecting satellites from laser directed energy weapons (particularly but not exclusively Infra-Red LDEWs), the skilled addressee would appreciate the described apparatus is equally applicable to protecting satellites (or aircraft) from other types of directed energy weapons. These include microwave weapons, particle-beam weapons and sonic weapons.

Any references to directional and positional descriptions such as, top, bottom, upper, lower, proximal, distal, inside, outside, rear, and directions e.g. "vertical", and "horizontal" etc. are to be interpreted by a skilled reader in the context of the examples described to refer to the orientation of features shown in the drawings, and are not to be interpreted as limiting the invention to the literal interpretation of the term, but instead should be as understood by the skilled addressee.

Where, in the foregoing description, integers or elements are mentioned that have known, obvious, or foreseeable equivalents, then such equivalents are herein incorporated as if individually set forth. Reference should be made to the claims for determining the true scope of the present disclosure, which should be construed so as to encompass any such equivalents. It will also be appreciated by the reader that integers or features of the disclosure that are described as optional do not limit the scope of the independent claims. Moreover, it is to be understood that such optional integers or features, while of possible benefit in some embodiments of the disclosure, may not be desirable, and can therefore be absent, in other embodiments.

The invention claimed is:

1. A system for protecting an entity against directed-energy weapons, the system comprising:
   a plurality of vehicles for protecting an entity against directed-energy weapons, each of said vehicles comprising:
   a housing; and
   a shield for blocking a laser beam, the shield, in use, extending from the housing;
   at least one controller operative to control the positions of the vehicles;
   at least one sensor for detecting a laser beam and generating data relating to the laser beam; and
   a controller for making position and/or attitude adjustments to the vehicle based on the data, wherein the data comprises at least one of the angle of attack of the laser beam, relative to the vehicle, the strength of the laser beam, and a footprint of the laser beam.

2. The vehicle according to claim 1, wherein the shield comprises a reflective material.

3. The vehicle according to claim 1, comprising hinged spokes for supporting the shield, the hinged spokes each being arranged to rotate about a respective axis such that in a stored configuration the respective axis of the hinged spokes are arranged substantially parallel to each other, and in the deployed configuration the spokes are arranged radially with respect to the housing.

4. The vehicle according to claim 1, comprising:
a gas source;
a plurality of hollow members coupled to the gas source and to the shield; and
a valve disposed between the gas source and the plurality of hollow members, the valve having an open position in which a gas is able to flow from the gas source to the plurality of hollow members and a closed position in which the gas cannot flow from the gas source to the plurality of hollow members,
wherein the hollow members are inflatable on the opening of the valve, and
wherein the inflation of the hollow members causes the plurality of hollow members to support the shield in a planar configuration.

5. The vehicle according to claim 1, comprising a secondary shield member rotatably coupled to the shield.

6. The vehicle according to claim 1, wherein the shield comprises a first layer and a second layer disposed adjacent to the first layer, wherein the first layer comprises a first material and the second layer comprises a second material, and wherein the first material has a higher thermal conductivity than the second material, and wherein the second material has a higher emissivity than the first material.

7. The vehicle according to claim 1, comprising a gradient index reflector disposed on an outside surface of the shield.

8. The vehicle according to claim 1, wherein the housing is an elongate tube having a first end and a second end, the shield extending from the first end, wherein in the stored configuration, the axes of the hinged spokes are parallel with the longitudinal axis of the housing.

9. The vehicle according to claim 1, wherein the vehicle is a satellite comprising positional thrusters, wherein the vehicle is configured to receive communications from the at least one controller operative to control the positions of the vehicles, and wherein the entity is a spacecraft.

10. The system according to claim 1, wherein the plurality of vehicles are arranged such that the plane of each of the shields is arranged in the same plane.

11. A method of coordinating a plurality of vehicles to protect an entity against directed-energy weapons, comprising:
defining, as a command vehicle, a vehicle in the plurality;
storing, by one or more storage devices located on one or more of the vehicles, a list of positions of each vehicle and a position of a laser weapon;
using the list of positions of each vehicle and the position of the laser weapon, determining, by one or more processors on the command vehicle, a shield configuration achievable by the plurality of vehicles that places the greatest number of shields between an entity associated with the plurality of vehicles and the laser weapon in the densest manner possible; and
sending, from the command vehicle to each vehicle a movement command that causes the respective vehicle to move to achieve the shield configuration,
wherein each vehicle comprises at least one sensor for detecting a laser beam and generating data relating to the laser beam,
wherein the data comprises at least one of the angle of attack of the laser beam, the strength of the laser beam, and the footprint of the laser beam, and
wherein the step of determining a shield configuration achievable by the plurality of vehicles that minimises the probability of an entity associated with the plurality of vehicles being struck by a laser beam fired by the laser weapon utilizes the data.

12. The method according to claim 11, comprising:
by one or more sensors, sensing a laser beam incident on at least one of the plurality of vehicles;
determining, by the one or more processors, a beamwidth of the laser beam; and
using the determined beamwidth of the laser beam when determining the shield configuration.

13. The vehicle according to claim 5, wherein the shield comprises a reflective material, comprising:
the at least one sensor for detecting a laser beam and generating data relating to the laser beam; and
the controller.

14. The vehicle according to claim 1, wherein the shield comprises a material configured to absorb a laser beam.

* * * * *